United States Patent [19]

Massey

[11] Patent Number: 5,411,048

[45] Date of Patent: May 2, 1995

[54] FLUID CONTROL VALVE WITH LATCHING HANDLE ASSEMBLY

[75] Inventor: Roger G. Massey, Portsmouth, N.H.

[73] Assignee: Parker & Harper Companies, Inc., Raymond, N.H.

[21] Appl. No.: 308,847

[22] Filed: Sep. 19, 1994

[51] Int. Cl.⁶ ..................... F16K 35/02; F16K 35/06
[52] U.S. Cl. ........................... 137/15; 70/177; 70/180; 70/212; 137/385; 251/95; 251/104; 251/110; 251/288
[58] Field of Search ................. 70/175, 176, 177, 178, 70/180, 212; 74/526, 543, 545; 137/385; 251/95, 102, 104, 110, 288

[56] References Cited

U.S. PATENT DOCUMENTS

| | | | |
|---|---|---|---|
| 1,322,721 | 11/1919 | Noonan | 137/385 |
| 3,401,715 | 9/1968 | Johnson et al. | 137/385 |
| 4,126,023 | 11/1978 | Smith et al. | 137/385 |
| 4,770,388 | 9/1988 | Carman | 251/95 |
| 4,909,275 | 3/1990 | Massey et al. | 137/385 |
| 5,014,528 | 5/1991 | Roberts | 137/385 |
| 5,115,834 | 5/1992 | Champagne | 137/385 |
| 5,183,073 | 2/1993 | Roberts | 137/385 |
| 5,188,335 | 2/1993 | Pettinaroli | 137/385 |
| 5,299,597 | 4/1994 | Fort et al. | 137/385 |
| 5,365,759 | 11/1994 | Bonomi | 137/385 |

*Primary Examiner*—George L. Walton
*Attorney, Agent, or Firm*—Davis, Bujold & Streck

[57] ABSTRACT

A valve handle latching assembly having a selectable latching slider which engages a detent on a fluid control device such as a ball valve. During assembly, a particular slider is selected for inclusion in the final assembly resulting in a valve tailored for its intended purpose. Depending upon which latching slider is selected, the valve handle latching assembly latches in the open and/or closed position(s) thereby preventing inadvertent rotation. The latching handle assembly may be manually disengaged to permit rotation of the handle in the opposite rotational direction.

8 Claims, 3 Drawing Sheets

FLUID CONTROL VALVE WITH LATCHING HANDLE ASSEMBLY

This invention relates to a valve handle latching assembly for stems of fluid control valves to lock rotational movement in predetermined specific locations relative to the valve body. In particular, though not exclusively, the assembly comprises a selectable slider resiliently biased within a detent in the valve body.

BACKGROUND OF THE INVENTION

Valves which control the flow of hazardous or valuable media are often provided with a latching device as a safety feature to prevent inadvertent operation; such safety devices require a deliberate preparatory action (releasing the latch) to render the valve operable. In the typical example, the latch automatically reengages when an operation has been completed.

While these prior art latching devices serve their intended purpose when operators are accustomed to their use or when the operating technique is self-evident, circumstances exist under which these latching devices become safety hazards themselves.

It is not unusual to find latching valves in applications where timely operation is crucial in preventing or remedying a hazard, a cargo valve which controls the flow of hazardous media provides an example. The cargo valve is opened in normal course to dispense cargo, then closed when delivery is completed. Safety considerations suggest that such a valve be secured in the closed position by a latching device requiring a deliberate action (unlatching) before being operable. However, since timely closing of this valve may be critical in avoiding a spill, the presence of a latching device becomes an impediment.

In other applications, a dangerous condition is created by closing, rather than opening, a valve. Manual valves used in emergency pressure relief applications must be readily operable in the closed-to-open direction then secured in the open position until the underlying cause of the over pressure problem is addressed. Encumbering such a valve with a latch that latches in both the open and closed positions compromises its function as an emergency device.

In many installations, valves are partially concealed; tank drain valves, unloading valves and valves used as components of equipment built into cabinets are often hidden from view. An individual intent on operating a latching valve not in full view must first be familiar with the latching device, or be willing to spend some time fumbling. In an emergency, an individual who is imperilled may pause in his flight to give a valve handle a quick twist, but he will almost certainly be unwilling to spend precious time contending with a balky latch whose operation he does not understand.

OBJECT OF THE INVENTION

Accordingly, it is an objective of the present invention to provide a handle for fluid control devices that latches in a predetermined rotational position.

Another objective of the invention is to provide a latching handle assembly which can be caused to engage in the open position of the valve exclusively, the closed position exclusively, or in both the open and the closed positions dependant upon which of three distinct latching slider components is selected for inclusion in the final assembly.

SUMMARY OF THE INVENTION

According to the invention there is provided a fluid control valve with a latching handle assembly comprising a quarter-turn valve having a valve body and valve stem; at least two detents provided on the valve body; a handle defining an opening shaped to engage a corresponding shape of the valve stem to preclude relative rotation therebetween, said handle being secured on the valve stem; and, a selectable slider slidably attached to said handle positioned to releasably engage said detents to prevent free rotation in at least one desired rotational direction.

According to the invention there is also provided a fluid control valve with a latching handle assembly comprising a quarter-turn valve having a valve body and valve stem; first and second detents formed on the valve body; a handle defining an opening shaped to engage a corresponding shape of the valve stem to preclude relative rotation therebetween, said handle being secured on the valve stem; a slider slidably attached to said handle positional to releasably engage said detents; and, camming means, defined by said slider and the first detent, for permitting relative rotation in a desired direction between said handle and the valve body from that detent while preventing relative rotation in a reverse direction once said slider engages the second detent.

According to the invention there is also provided a fluid control valve with a latching handle assembly comprising a quarter-turn valve having a valve body and valve stem; first and second detents provided on the valve body; a handle defining an opening shaped to engage a corresponding shape of the valve stem to preclude relative rotation therebetween, said handle being secured on the valve stem; and an interchangeable slider slidably attached to said handle for releasably engaging said detents, said slider providing a desired tailored final assembly configured for one of a a) free clockwise rotation and manual release to permit counterclockwise rotation, b) free counterclockwise rotation and manual release to permit clockwise rotation and c) manual release to permit both clockwise rotation counterclockwise rotation.

According to the invention there is also provided in a fluid control valve having a latching handle of the type in which a latching means having a detent is provided as a safety feature to prevent inadvertent operation, the improvement comprising a selectable slider slidably attached to said handle for releasably engaging said detent to prevent free rotation in at least one desired rotational direction, said handle being configured to accept a plurality of differently shaped selectable sliders, said slider being selected from a group consisting of a right chamfered tang latching slider, a left chamfered tang latching slider, and a straight tang latching slider.

According to the invention there is also provided a method of manufacturing a fluid control valve with a latching handle assembly comprising a quarter-turn valve having a valve body and valve stem and a handle defining an opening shaped to engage a corresponding shape of the valve stem to preclude relative rotation therebetween, said method comprising the steps of (a) providing at least two detents on the valve body; (b) selecting one of a right chamfered tang latching slider, a left chamfered tang latching slider, and a straight tang latching slider for releasably engaging one of said detents to prevent free rotation in at least one desired rotational direction; (c) slidably mounting said selected latching slider on said handle thereby forming an assembly; and, (d) securing said assembly on the valve stem of the valve.

BRIEF INTRODUCTION TO THE DRAWINGS

The invention will now be described, by way of example, with reference to the accompanying drawings in which.

DETAILED DESCRIPTION OF THE INVENTION

Figure 1:
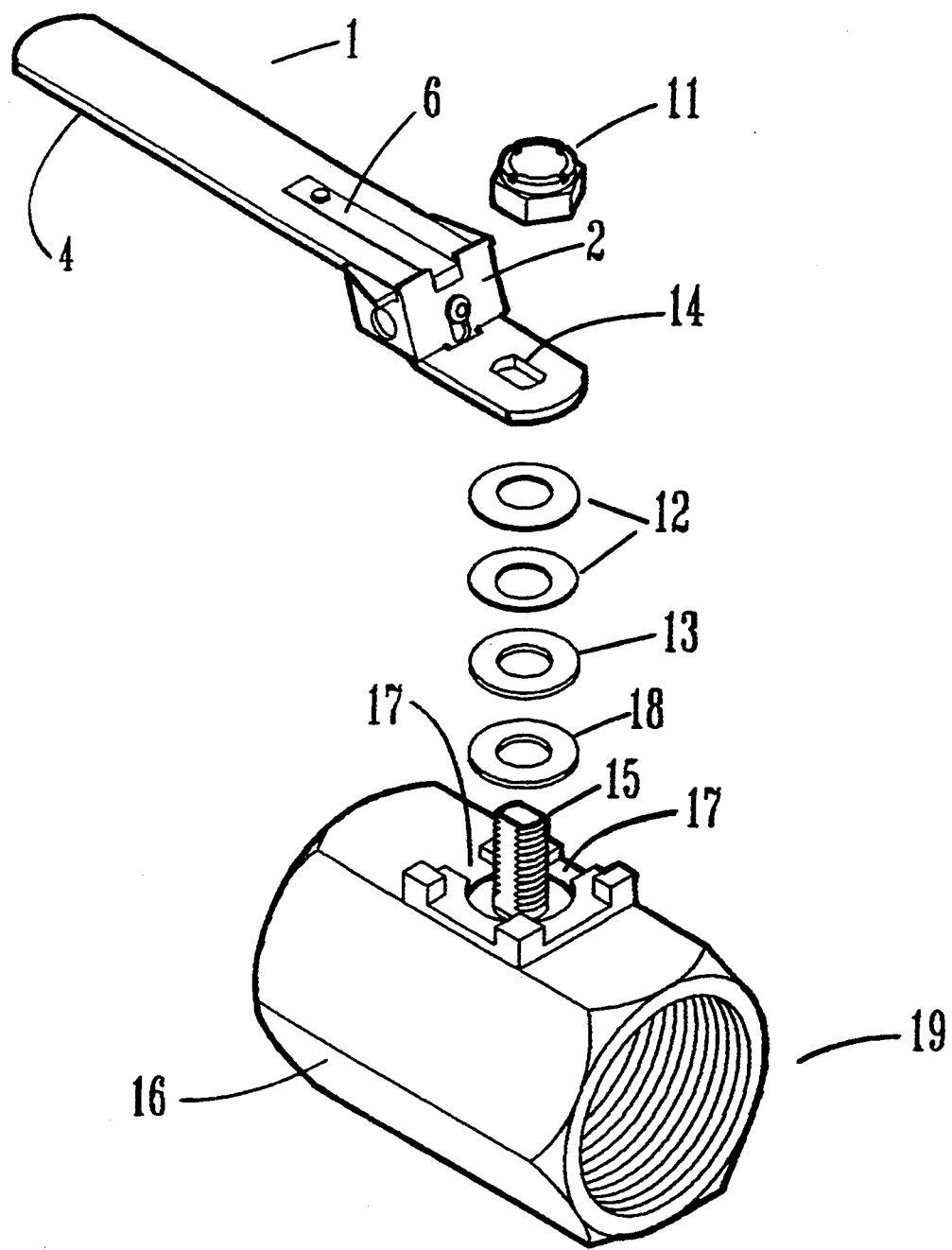
FIG. 1 is a partial exploded perspective view of the present invention showing a latching handle assembly being fitted onto a valve stem of a ball valve.
Figure 2:
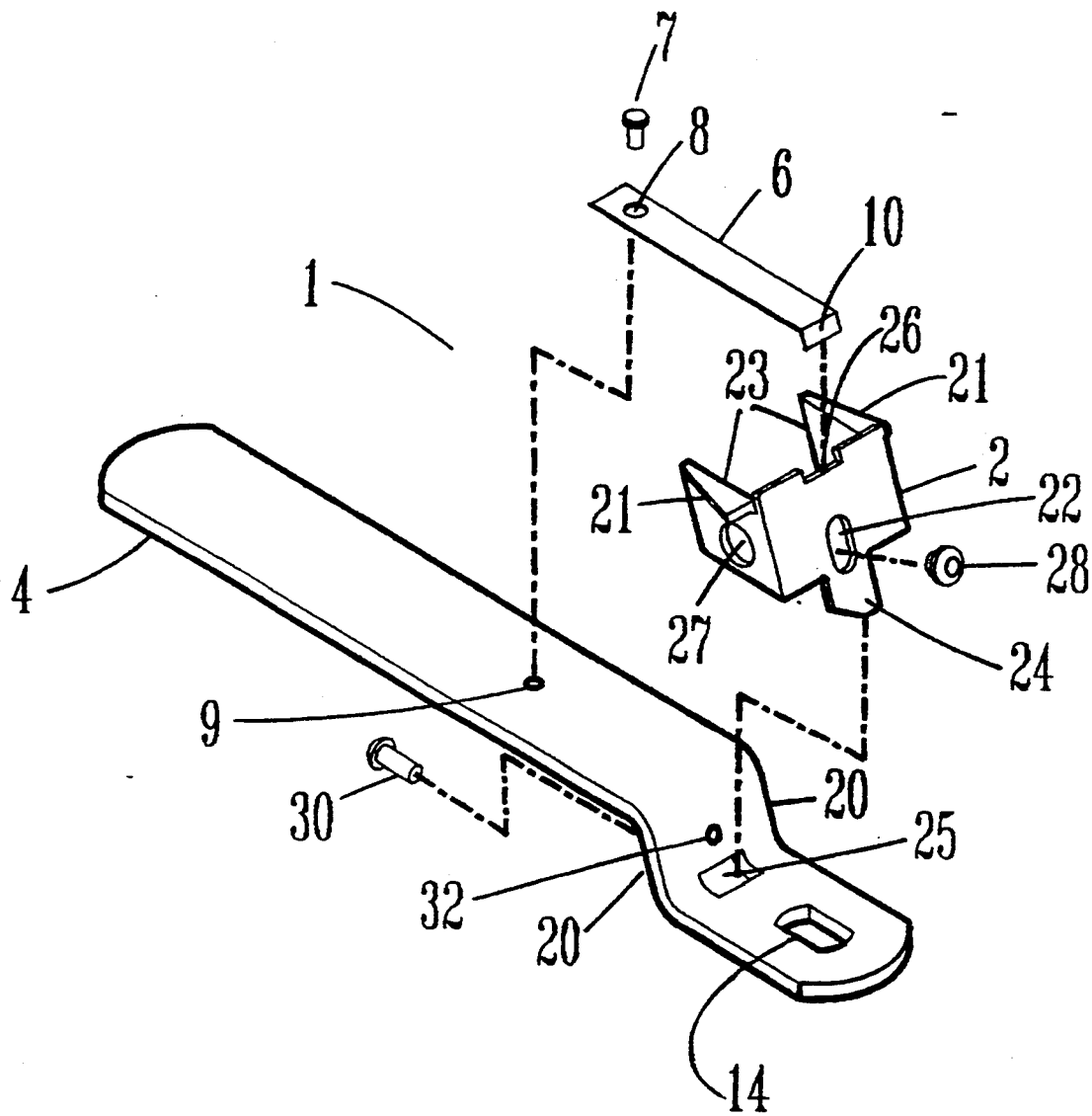
FIG. 2 is an exploded perspective view of the present invention showing the latching handle assembly.

Turning first to FIGS. 1 and 2, ball valve 19 is operated by latching handle assembly 1. Latching handle assembly 1 comprises a handle 4 having a valve stem hole 14, a latching slider 2, and a leaf spring 6. The latching handle assembly 1 is secured over valve stem 15 by stem nut 11 with belleville washers 12, large follower 13 and large thrustwasher 18 located therebetween. When secured, latching slider 2 of latching handle assembly 1 engages one of two detents 17 in a predetermined rotational position to prevent rotation in a selected direction or in both directions.

Latching handle assembly 1 comprises latching slider 2 slidably attached to handle 4 by means of slider retainer drive stud 30 passing through clearance hole 32 within the handle 4. Slot 22 in latching slider 2 engages slider retainer drive stud 30 thereby allowing transverse movement of latching slider 2 relative to slider retainer drive stud 30 along the longitudinal axis of slot 22. Slider retainer 28 secures slider 2 by being fastened to slider retainer drive stud 30. Latching slider 2 is held in alignment with handle 4 by way of slider sides 23 of slider 2 engaging handle sides 20 of handle 4 and by way of tang 24 protruding through aperture 25 of handle 4.

Leaf spring screw 7, passing through clearance hole 8 of leaf spring 6 and engaging threaded hole 9 of handle 4, secures leaf spring 6 to handle 4. However, instead of using leaf spring screw 7 and threaded hole 9, a suitable rivet or other fastening means may be used. Tab 10 of leaf spring 6 engages notch 26 of latching slider 2 to provide a resilient bias for latching slider 2. Of course, leaf spring 6 may be replaced with a suitable helical or torsional spring to provide the resilient bias. Also, as will be apparent to one of ordinary skill in the art, a spring need not be used at all. That is, engagement between tang 24 and detent 17 may be maintained by gravity when valve body 16 is so positioned.

Once assembled, latching slider 2 is resiliently biased by leaf spring 6 against handle 4 such that tang 24 protrudes through aperture 25 engaging a detent 17 in valve body 16. While detented, the handle 4 is held fast and can be moved only after tang 24 is released from detent 17 by raising latching slider 2. If a latching slider 2 having a straight tang 24c (see FIG. 5) is used, latching slider 2 must be raised manually to operate the valve in either the closed or open positions. The operator merely grasps latching slider 2 at slider wings 21 between thumb and forefinger to slide latching slider 2 along the longitudinal axis of slot 22 against the bias of leaf spring 6. The operator may then rotate latching handle assembly 1 relative to valve body 16 to open or close ball valve 19. The operator may then release the latching slider 2 and when latching handle assembly 1 is positioned above the adjacent detent 17, latching slider 2 automatically engages detent 17 by means of the resilient bias of leaf spring 6. If latching slider 2 has a chamfered tang 24a or 24b (see FIGS. 3 and 4, respectively), handle 4 may freely be turned toward the chamfer from an appropriate one of its detents 17 as the chamfered edge cams latching slider 2 away from that detent 17, thereby allowing rotation of handle assembly 1. Similarly, when latching handle assembly 1 is positioned above the other of its detents 17, latching slider 2 automatically engages that detent 17 by means of the resilient bias of leaf spring 6. However, when latching slider 2 is in that other detent 17, the latching slider 2 must be raised manually, as described above, to permit rotation back in the opposite rotational direction.

Latching slider 2 contains lock hole 27 in either or both slider sides 23. Once assembled, latching handle assembly 1 may be locked in position by placing a pad lock or locking pin (not shown) through lock hole 27. The lock shackle interferes with the handle 4 thereby preventing latching slider 2 from either manual or automatic disengagement with detent 17.

Figure 3:
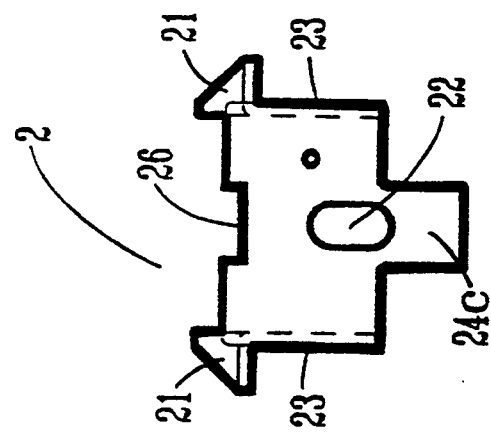
FIG. 3 is a front elevation of the latching slider of the present invention showing a left chamfered tang to permit counterclockwise rotation.
Figure 4:
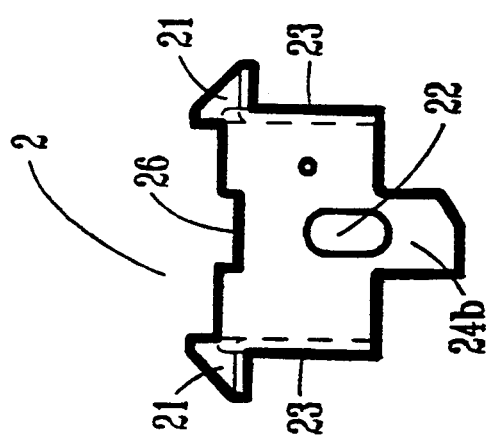
FIG. 4 is a front elevation of the latching slider of the present invention showing a right chamfered tang to permit clockwise rotation.
Figure 5:
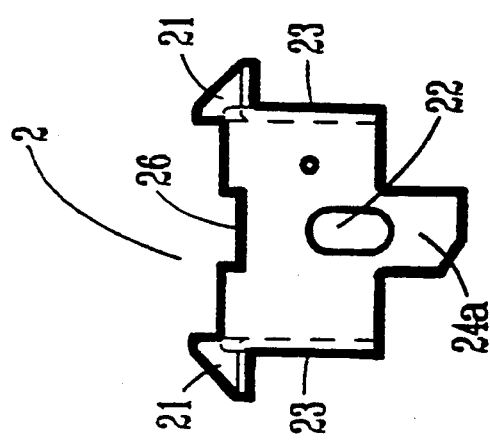
FIG. 5 is a front elevation of the latching slider of the present invention showing a straight tang to prevent rotation in both directions.

Turning now to FIGS. 3–5 there is shown latching slider 2. A particular latching slider 2 can be chosen prior to final assembly of the latching handle assembly 1 to provide a product perfectly tailored for its intended service. That is, a latching slider that allows latching handle assembly 1 to be freely turned counterclockwise from its clockwise detent 17 may be accomplished by selecting the latching slider shown in FIG. 3. Here, left chamfered tang 24a cams latching slider 2 away from one of the detents 17 thereby allowing rotation. When latching slider 2 is engaged in the other of the detents 17, latching slider 2 must be raised manually to allow clockwise motion. Conversely, if latching slider 2 having a right chamfered tang 24b shown in FIG. 4 is selected, free clockwise operation of latching handle assembly 1 is permitted while requiring latching slider 2 to be raised manually to allow counterclockwise rotation of latching handle assembly 1. Here, the right chamfered tang 24b cams the latching slider 2 away from detent 17 thereby allowing free clockwise rotation. If latching slider 2 having straight tang 24c is used as shown in FIG. 5, latching slider 2 must be raised manually to permit either clockwise or counterclockwise rotation of latching handle assembly 1 since no camming action is provided.

What is claimed is:

1. A fluid control valve with a latching handle assembly comprising:
   a quarter-turn valve having a valve body and valve stem;
   first and second detents provided on the valve body;
   a handle defining an opening shaped to engage a corresponding shape of the valve stem to preclude relative rotation therebetween, said handle being secured on the valve stem; and an interchangeable slider slidably and selectably attached to said handle for releasably engaging said detents, said slider having a desired tailored shape configured for one of a) free clockwise rotation of said handle and manual sliding releasable movement of said slider from said second detent required to permit counterclockwise rotation of said handle only to initially rotate said handle, thereafter during further rotation of said handle the manual sliding releasable movement is returned toward its original position until engagement with said first detent, wherein said slider has a right chamfered tang for camming engagement along said first detent during the free clockwise rotation and latching engagement within said second detent at the end of said clockwise rotation, b) free counterclockwise rotation of said handle and manual sliding releasable movement of said slider from said first detent required to permit clockwise rotation of said handle only to initially rotate said handle, thereafter during further rotation of said handle the manual sliding releasable movement is returned toward its original position until engagement with said second detent, wherein said slider has a left chamfered tang for camming engagement along said second detent during the free counterclockwise rotation and latching engagement within said first detent at the end of said counterclockwise rotation, and c) manual sliding releasable movement of said slider from said first and second detents required to permit both clockwise rotation and counterclockwise rotation of said handle only to initially rotate said handle, thereafter during further rotation of said handle the manual sliding releasable movement is returned toward its original position until engagement with said first detent, wherein said slider has a straight tang for latching engagement within said first and second detents at the end of both clockwise and counterclockwise rotation.

2. The valve according to claim 1 wherein said handle comprises an aperture located adjacent said shaped opening for receiving said tang of said slider.

3. The valve according to claim 2 wherein said assembly comprises a means for resiliently biasing said tang within said aperture.

4. The valve according to claim 3 wherein said slider comprises a slot having a substantially longitudinal axis, said slot allowing movement of said slider along said axis relative to said handle.

5. In a fluid control valve having a latching handle of the type in which a latching means having a first and second detent is provided as a safety feature to prevent inadvertent operation, the improvement comprising:

an interchangeable slider slidably and selectably attached to said handle for releasably engaging said detents to prevent free rotation in at least one desired rotational direction, said handle being configured to accept a plurality of differently shaped interchangeable and selectable sliders, said slider being selected from a group consisting of: a right chamfered tang latching slider for camming engagement along said first detent to permit free clockwise rotation of said handle and for latching engagement within said second detent at the end of said clockwise rotation, said slider being manually slidably releasable from said second detent to permit counterclockwise rotation of said handle only to initially rotate said handle, thereafter during further rotation of said handle the manual sliding releasable movement is returned toward its original position until engagement with said first detent, a left chamfered tang latching slider for camming engagement along said second detent to permit free counterclockwise rotation of said handle and for latching engagement within said first detent at the end of said counterclockwise rotation, said slider being manually slidably releasable from said first detent to permit clockwise rotation of said handle only to initially rotate said handle, thereafter during further rotation of said handle the manual sliding releasable movement is returned toward its original position until engagement with said second detent, and a straight tang latching slider for latching engagement within said first and second detents at the end of each both clockwise and counterclockwise rotation, said slider being manually slidably releasable from said detents to permit both clockwise and counterclockwise rotation of said handle only to initially rotate said handle, thereafter during further rotation of said handle the manual sliding releasable movement is returned toward its original position until engagement with said first detent.

6. The improvement according to claim 5 further comprising a resilient biasing means located between said slider and said handle to bias said slider toward said detents.

7. A method of assembling a fluid control valve with a latching handle assembly comprising a quarter-turn valve having a valve body and valve stem and a handle defining an opening shaped to engage a corresponding shape of the valve stem to preclude relative rotation therebetween, said method comprising the steps (a) providing a first and second detent on the valve body;

(b) selecting one of i) a right chamfered tang latching slider for camming engagement along said first detent to permit free clockwise rotation of said handle and for latching engagement within said second detent at the end of said clockwise rotation, said slider being manually slidably releasable from said second detent to permit counterclockwise rotation of said handle only to initially rotate said handle, thereafter during further rotation of said handle the manual sliding releasable movement is returned toward its original position until engagement with said first detent, ii) a left chamfered tang latching slider for camming engagement along said second detent to permit free counterclockwise rotation of said handle and for latching engagement within said first detent at the end of said counterclockwise rotation, said slider being manually slidably releasable from said first detent to permit clockwise rotation of said handle only to initially rotate said handle, thereafter during further rotation of said handle the manual sliding releasable movement is returned toward its original position until engagement with said second detent, and iii) a straight tang latching slider for latching engagement within said first and second detents at the end of each both clockwise and counterclockwise rotation, said slider being manually slidably releasable from said detents to permit both clockwise and counterclockwise rotation of said handle only to initially rotate said handle, thereafter during further rotation of said handle the manual sliding releasable movement is returned toward its original position until engagement with said first detent;

(c) slidably mounting said selected latching slider on said handle thereby forming an assembly; and, (d) securing said assembly on the valve stem of the valve.

8. The method according to claim 7 further comprising the step of attaching a resilient biasing means between said slider and said handle to bias said slider toward said detents.

* * * * *